United States Patent
Hood et al.

(10) Patent No.: US 8,232,024 B2
(45) Date of Patent: Jul. 31, 2012

(54) VARIABLE COMPRESSIBILITY GASKETS

(75) Inventors: Peter D. Hood, Leicestershire (GB); Simon E. Foster, Leicestershire (GB)

(73) Assignee: Intelligent Energy Limited, Leicestershire (GB)

( * ) Notice: Subject to any disclaimer, the term of this patent is extended or adjusted under 35 U.S.C. 154(b) by 754 days.

(21) Appl. No.: 12/162,910

(22) PCT Filed: Feb. 1, 2007

(86) PCT No.: PCT/GB2007/000324
§ 371 (c)(1),
(2), (4) Date: Oct. 10, 2008

(87) PCT Pub. No.: WO2007/088354

PCT Pub. Date: Aug. 9, 2007

(65) Prior Publication Data

US 2009/0029231 A1    Jan. 29, 2009

(30) Foreign Application Priority Data

Feb. 1, 2006   (GB) .................. 0601986.3

(51) Int. Cl.
    *H01M 8/02* (2006.01)
(52) U.S. Cl. ........ 429/512; 429/469; 429/483; 429/508; 429/514; 277/628
(58) Field of Classification Search .............. 429/469, 429/483, 508, 512, 514; 277/628
See application file for complete search history.

(56) References Cited

U.S. PATENT DOCUMENTS

| | | | |
|---|---|---|---|
| 3,615,838 A * | 10/1971 | Erickson | 429/451 |
| 3,978,265 A | 8/1976 | Hillier et al. | |
| 4,721,555 A | 1/1988 | Grosshandler | |
| 4,846,482 A | 7/1989 | Blodgett et al. | |
| 5,510,069 A | 4/1996 | Schuppler et al. | |
| 6,543,787 B1 | 4/2003 | Inciong | |
| 6,840,969 B2 * | 1/2005 | Kobayashi et al. | 29/623.2 |
| 6,991,868 B2 * | 1/2006 | Lee et al. | 429/457 |
| 7,435,501 B2 | 10/2008 | Peace et al. | |
| 7,498,094 B2 | 3/2009 | Hood et al. | |
| 2003/0091885 A1 | 5/2003 | Kobayashi et al. | |
| 2005/0048351 A1 | 3/2005 | Hood et al. | |
| 2005/0106445 A1 | 5/2005 | Mitchell et al. | |
| 2005/0202304 A1 | 9/2005 | Peace et al. | |
| 2005/0214620 A1 | 9/2005 | Cho et al. | |

(Continued)

FOREIGN PATENT DOCUMENTS

EP          1302996          4/2003

(Continued)

OTHER PUBLICATIONS

Amended Claims as filed in corresponding European patent application EP1984661, dated Oct. 28, 2008.

(Continued)

*Primary Examiner* — Gregg Cantelmo
(74) *Attorney, Agent, or Firm* — Fish & Richardson P.C.

(57) ABSTRACT

A gasket formed of compressible material and having a first sealing surface and a second sealing surface for providing a fluid seal between a first component and a second component, a plurality of cavities provided within the gasket proximate the first and/or second sealing surfaces and extending over at least a first portion of the gasket to provide increased compressibility of the gasket in the first portion.

13 Claims, 10 Drawing Sheets

U.S. PATENT DOCUMENTS

| | | | |
|---|---|---|---|
| 2006/0154130 A1 | 7/2006 | Hood et al. |
| 2006/0257699 A1 | 11/2006 | Hood et al. |
| 2006/0292429 A1 | 12/2006 | Baird et al. |
| 2007/0166596 A1 | 7/2007 | Benson |
| 2008/0145738 A1 | 6/2008 | Benson |
| 2008/0248336 A1 | 10/2008 | Matcham et al. |
| 2008/0314660 A1 | 12/2008 | Davies et al. |

FOREIGN PATENT DOCUMENTS

| | | |
|---|---|---|
| GB | 1480218 | 7/1977 |
| GB | 2123904 | 2/1984 |
| GB | 2194005 | 2/1988 |
| JP | 1982-023458 | 7/1982 |
| JP | 2004-14150 A | 1/2004 |
| JP | 2005-207095 | 8/2005 |
| JP | 3690682 | 8/2005 |
| JP | 2005-532663 | 10/2005 |
| WO | 2004/006367 | 1/2004 |
| WO | WO2004/038824 | 5/2004 |

OTHER PUBLICATIONS

International Search Report and Written Opinion in Application No. PCT/GB2007/000324, dated Jun. 1, 2007.
Search Report in Application No. GB0601986.3, dated May 31, 2006.
International Preliminary Report on Patentability in Application No. PCT/GB07/000324, dated Aug. 5, 2008.
Written Opinion in Singapore Application No. 200805689-7, dated Oct. 20, 2009.
Action issued in Russian Patent Application No. 2008135351/06(045079) on Apr. 5, 2011 (with translation).
Examination Report issued in Singapore Patent Application No. 200805689-7 on Feb. 3, 2011.
Letter re translated Office Action issued in Mexican Patent Application MX/A/2008/010014 on Aug. 17, 2011.
Letter dated Jan. 27, 2012 re translated Office Action issued in Mexican Patent Application MX/A/2008/010014.
Machine translation of JP2005-207095 dated Feb. 29, 2012.
Machine translation of JP1982-023458 dated Feb. 29, 2012.
Authorized Yosuke Tsurue, Notification of Reason for Refusal in Japanese Patent Application No. 2008-552881, mailed Jan. 25, 2012, 3 pages.

* cited by examiner

VARIABLE COMPRESSIBILITY GASKETS

The present invention relates to gaskets, and in particular gaskets for use in fuel cell assemblies.

Figure 1:
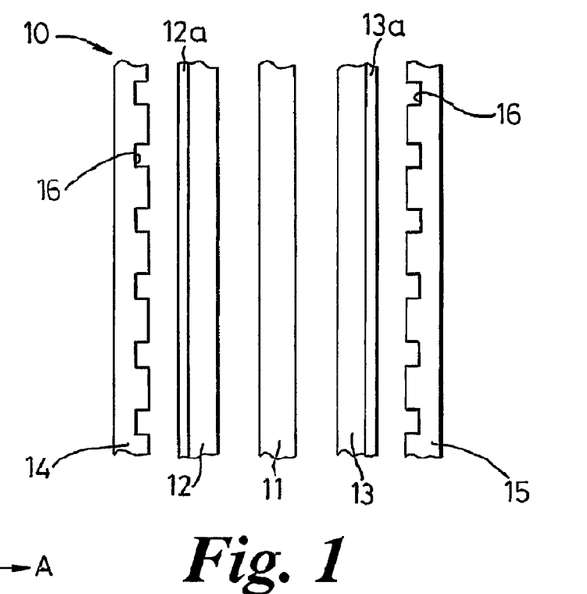
FIG. 1 shows a schematic cross-sectional view through a part of a conventional fuel cell.

Conventional electrochemical fuel cells convert fuel and oxidant into electrical energy and a reaction product. A typical layout of a conventional fuel cell 10 is shown in FIG. 1 which, for clarity, illustrates the various layers in exploded form. A solid polymer ion transfer membrane 11 is sandwiched between an anode 12 and a cathode 13. Typically, the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to as the membrane-electrode assembly, or MEA.

Sandwiching the polymer membrane and porous electrode layers is an anode fluid flow field plate 14 and a cathode fluid flow field plate 15. Intermediate backing layers 12a and 13a may also be employed between the anode fluid flow field plate 14 and the anode 12 and similarly between the cathode fluid flow field plate 15 and the cathode 13. The backing layers are of a porous nature and fabricated so as to ensure effective diffusion of gas to and from the anode and cathode surfaces as well as assisting in the management of water vapour and liquid water.

The fluid flow field plates 14, 15 are formed from an electrically conductive, non-porous material by which electrical contact can be made to the respective anode electrode 12 or cathode electrode 13. At the same time, the fluid flow field plates facilitate the delivery and/or exhaust of fluid fuel, oxidant and/or reaction product to or from the porous electrodes 12, 13. This is conventionally effected by forming fluid flow passages in a surface of the fluid flow field plates, such as grooves or channels 16 in the surface presented to the porous electrodes 12, 13.

Figure 2A:
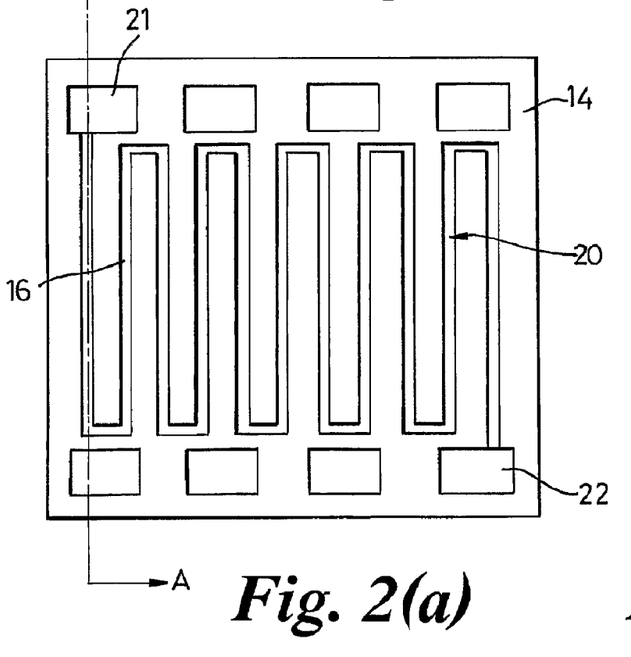
FIGS. 2(a) and 2(b) respectively show a simplified plan and sectional view of a fluid flow field plate of the fuel cell of FIG. 1.

With reference also to FIG. 2(a), one conventional configuration of fluid flow channel provides a serpentine structure 20 in a face of the anode 14 (or cathode 15) having an inlet manifold 21 and an outlet manifold 22 as shown in FIG. 2(a). According to conventional design, it will be understood that the serpentine structure 20 comprises a channel 16 in the surface of the plate 14 (or 15), while the manifolds 21 and 22 each comprise an aperture through the plate so that fluid for delivery to, or exhaust from, the channel 20 can be communicated throughout the depth of a stack of plates in a direction orthogonal to the plate as particularly indicated by the arrow in the cross-section on A-A shown in the FIG. 2(b).

Figure 3:
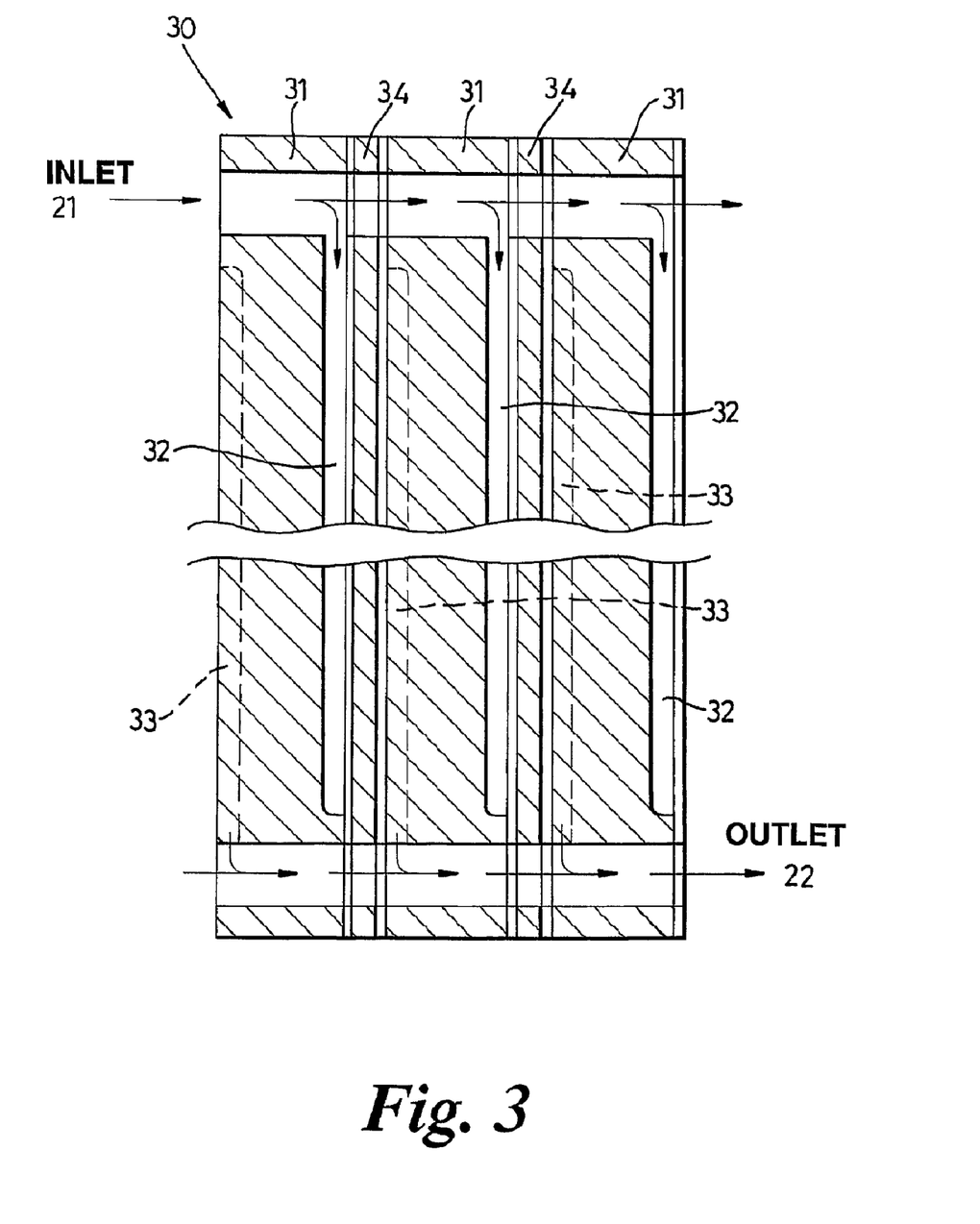
FIG. 3 shows a cross-sectional view through a conventional fuel cell stack with bipolar plates.

With reference to FIG. 3, in conventional fuel cell assemblies 30, stacks of plates are built up. In this arrangement, adjacent anode and cathode fluid flow field plates are combined in conventional manner to form a single bipolar plate 31 having anode channels 32 on one face and cathode channels 33 on the opposite face, each adjacent to a respective membrane-electrode assembly (MEA) 34. The inlet manifold apertures 21 and outlet manifold apertures 22 are all overlaid to provide the inlet and outlet manifolds to the entire stack. The various elements of the stack are shown slightly separated for clarity, although it will be understood for the purposes of the present invention that they will be compressed together using sealing gaskets.

Figure 4A:
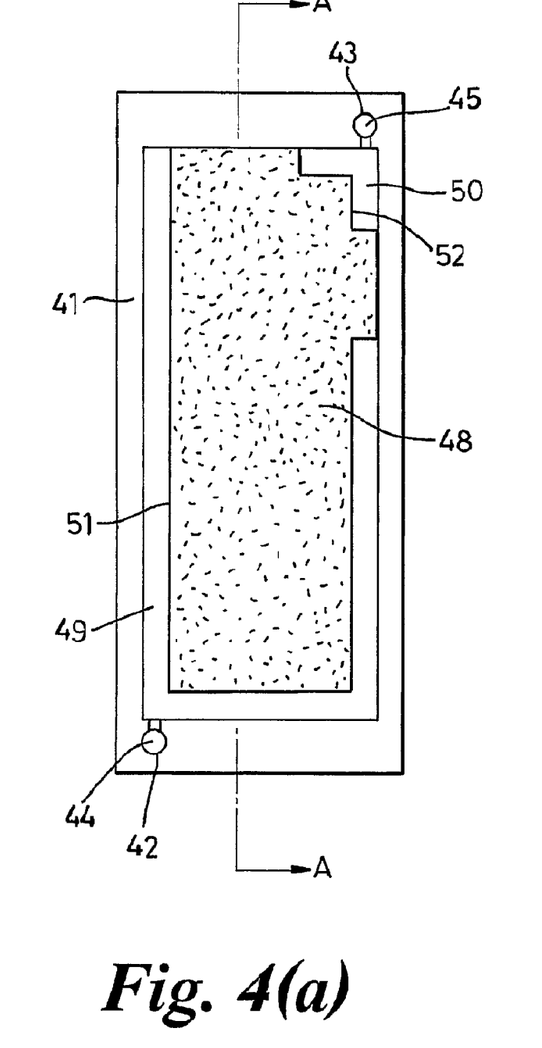
FIG. 4a shows a plan view of an anode configuration having a sheet of diffuser material positioned with respect to a sealing gasket and fluid entry and exit ports.
Figure 4B:
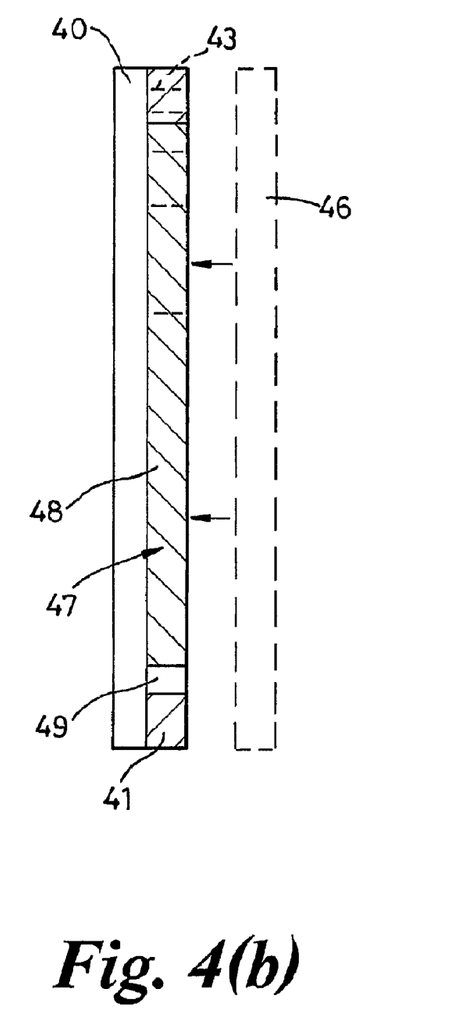
FIG. 4b shows the corresponding sectional side view on line A-A.

Referring to FIG. 4, an anode face of a membrane-electrode assembly 40 is overlaid with a sealing gasket 41 around its perimeter. The sealing gasket 41 includes two apertures 42, 43 around a fluid entry port 44 and a fluid exit port 45 at a periphery of the anode face of the MEA 40. An electrically conductive anode plate 46 (shown in dashed outline in FIG. 4b and slightly separated for clarity, but omitted in FIG. 4a to reveal the structures below) overlies the sealing gasket 41.

The anode face of the MEA 40, the sealing gasket 41 and the anode plate 46 together define a fluid containment volume 47 between the fluid entry port 44 and the fluid exit port 45. The fluid containment volume is effected by the impermeability of the anode plate 46 and sealing gasket 41 together with limited permeability of the MEA (i.e. substantially allowing ion flow only). Within this containment volume 47 is laid a sheet of diffuser material 48. The sheet of diffuser material is cut to a shape which results in the formation of one or more plenums 49, 50 defined between a lateral edge 51, 52 of the sheet 48 and the sealing gasket 41. More particularly, as shown in FIG. 4, the first plenum 49 constitutes an inlet plenum that extends around a major portion of the peripheral lateral edge 51 of the sheet 48 of diffuser material (i.e. most of three sides). The second plenum 50 constitutes an outlet plenum that extends around a minor portion of the peripheral lateral edge 52 of the sheet 48 of diffuser material.

Conventional gaskets, being uniform in thickness and composition, will normally suffice when the sealing surfaces are uniformly flat and parallel. Uniform compression applied over the sealing surfaces can then provide an adequate seal. However, in certain circumstances the use of such a conventional gasket may not be optimal. For example, when surface features such as additional components are to be included on a sealing surface, the uniform compressibility of a gasket will result in a non-uniform pressure across the area of the gasket. Regions of reduced distance between sealing surfaces, e.g. due to surface protrusions, will be subject to higher pressures, and regions of increased distance between sealing surfaces, e.g. surrounding such protrusions, will be subject to correspondingly lower pressures. This may reduce reliability and/or efficacy of a seal. Also, a conventional gasket may have a tendency to swell at the edges of the sealing area under pressure, displacing the gasket material outside the sealing area.

For a conventional gasket material, high pressures may therefore be needed to ensure that an adequate seal is obtained. For thin gaskets in particular, the pressure required may be even greater, since the compressibility of the gasket is reduced. Alternatively, the requirements for the sealing surfaces to have more highly toleranced flatness and parallelism may be increased.

Under high pressures, a gasket may also be subject to material creep which, over time, might reduce the effectiveness of the seal. This reduction in effectiveness may also be exacerbated by thermal cycling.

One solution to the above mentioned problems is to create 3-dimensional engineered gaskets specifically shaped to conform to contoured surfaces. These gaskets may, however, be prohibitively expensive and, being of variable thickness, may still not provide a sufficiently uniform seal in certain circumstances such as in the example fuel cells shown herein.

Another solution is to increase the compressibility of the gasket material, in order to accommodate non-uniform surfaces and to allow a reduced sealing pressure. Such gaskets may, however, have an increased undesirable tendency to displace outside the sealing area.

There is therefore a need for a gasket which can effectively seal against non-uniform surfaces, which has a reduced tendency to displace outside the sealing area, which is able to seal under lower sealing pressures and which has a reduced cost of manufacture compared to 3-dimensional engineered gaskets.

It is an object of the present invention to provide a gasket which overcomes one or more of the problems of prior art gaskets.

According to a first aspect, the present invention provides a gasket formed of compressible material and having a first sealing surface and a second sealing surface for providing a fluid seal between a first component and a second component, a plurality of cavities provided proximate the first and/or second sealing surfaces and extending over at least a first portion of the gasket to provide increased compressibility of the gasket in the first portion.

According to a second aspect, the present invention provides a method of sealing a fuel cell, comprising: providing a gasket formed of compressible material having a first sealing surface and a second sealing surface and a plurality of cavities proximate the first and/or second sealing surfaces and extending over at least a first portion of the gasket to provide increased compressibility of the gasket in the first portion; positioning the gasket between a fluid flow field plate and a membrane-electrode assembly; and applying compressive pressure between the fluid flow field plate and membrane-electrode assembly across the gasket to provide a fluid seal therebetween.

According to a third aspect, the present invention provides a fuel cell comprising: a membrane electrode assembly; a fluid flow field plate; and a gasket according to the first aspect.

Advantages of the invention, in comparison with conventional gaskets, may include a reduction in a total applied load needed to form a seal, an improved ability of the gasket to maintain a seal after thermal cycling, and an ability to seal around surface protrusions on one or both of the sealing surfaces.

Embodiments of the present invention will now be described by way of example and with reference to the accompanying drawings in which.

Figure 2B:
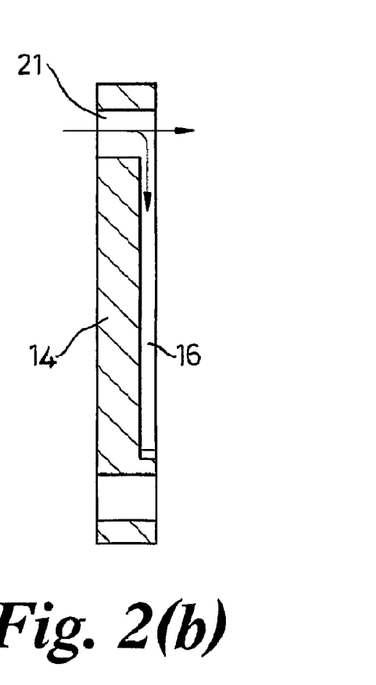

The conventional designs of anode and cathode fluid flow plates incorporating fluid flow channels in the faces thereof have already been discussed in connection with FIGS. 1 to 3, and the arrangement of a typical gasket for use with such plates in connection with FIG. 4.

Figure 5:
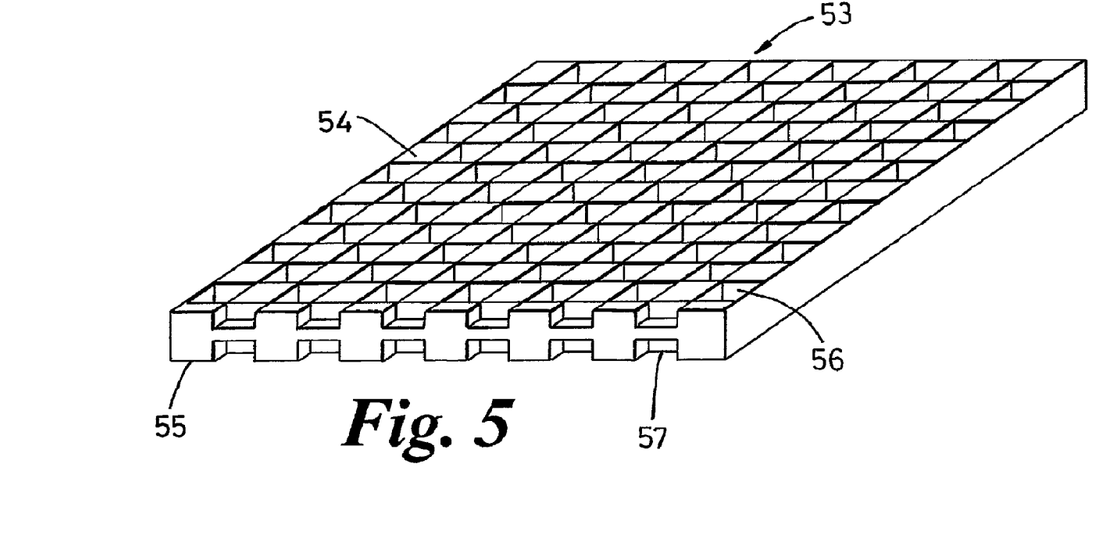
FIG. 5 shows a perspective view of the construction of part of a gasket of the present invention.

FIG. 5 illustrates a representative portion of a gasket 53 of the present invention. The gasket 53 has a first sealing surface 54 and a second sealing surface 55. A first plurality of cavities 56 is provided within the gasket 53 at the first sealing surface and extending over the portion of the gasket. In this particular embodiment, the cavities 56 extend in a regular array over the portion of the gasket 53 shown. Also shown is a second plurality of cavities 57 provided within the gasket at the second sealing surface 55, being in this embodiment substantially similar in size and arrangement to the first plurality of cavities.

Although the cavities 56 are shown in FIG. 5 as being provided at the surface 54, in other embodiments the cavities 56 may be provided below the surface 54, but sufficiently close to the surface so as to influence the local surface compressibility through the thickness of the gasket 53.

The sealing surface 54, 55 of the gasket is defined as being that surface which comes into contact with the surface of the component to which the gasket is to be sealed. The sealing surface does not generally therefore include the interior surface of the cavities 56, 57. However, as the pressure applied to the gasket 53 is increased, a proportion of the interior surface of the cavities 56, 57 may become part of the sealing surface of the gasket 53, which proportion increases with increasing applied pressure.

The term "cavity density" is used herein as a measure of the number of cavities present over any defined area of the gasket 53. The cavity density over a first sealing surface 54 of a portion of the gasket 53 may be different from the cavity density over a second sealing surface 55 of the same portion of the gasket 53. For example, if the area of the sealing surface 54 of the gasket 53 of FIG. 5 is 1 cm$^2$ and the number of cavities is 36, the cavity density on the first sealing surface is 36 cm$^{-2}$.

The term "cavity volume" as used herein is the total void volume of any given cavity, which may be usefully given in terms of an average figure for cavities in the gasket 53 or a certain region thereof.

It will be recognised that the cavity density and the cavity volume in a region of the gasket will each, at least in part, determine the compressibility of that region of the gasket.

The term "compressible material" is intended to encompass solid materials which can be significantly deformed under applied compressive pressure, and whose physical mechanical properties may be characterised by a combination of elastic, i.e. recoverable, and plastic, i.e. permanent and non-recoverable, deformation under an applied pressure. Time-dependent effects such as creep and viscoelasticity may also define in part the properties of the compressible material.

An increase in the compressibility of a region of the gasket will correspond to a reduction in the pressure needed to compress the total thickness of that region by the same degree.

Alternatively put, the same applied pressure will cause the total thickness of that region to be reduced by a greater degree.

Figure 6:
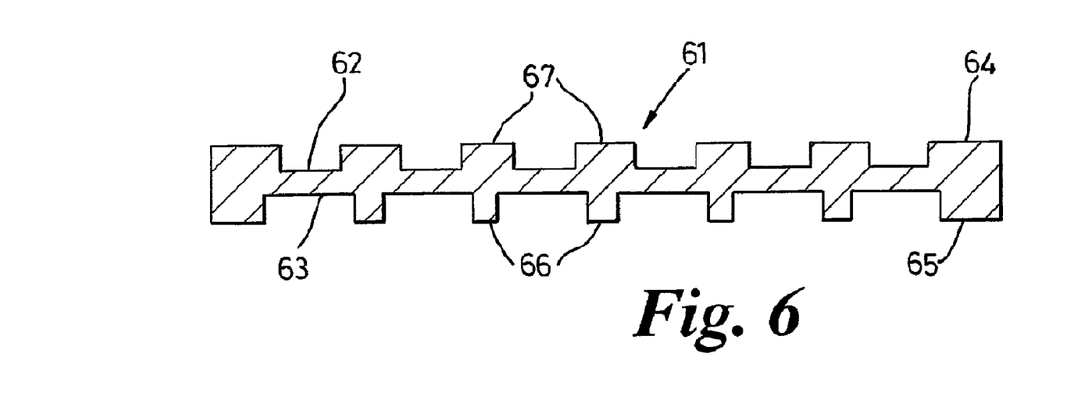
FIG. 6 shows a cross-sectional view of a portion of a gasket of an embodiment of the present invention.

Shown in FIG. 6 is a cross-sectional view of an alternative asymmetric arrangement of cavities 62, 63 in a gasket 61 of the present invention, in which the cavity volumes are different on the first sealing surface 64 and second sealing surface 65. Cavities 62 proximate the first sealing surface 64 are of different dimensions to cavities 63 proximate the second sealing surface 65. The result of this type of variation in cavity volume will be that the gasket material 66 between the larger cavities 63 is able to compress further than the gasket material 67 between the smaller cavities 62 under the same applied pressure.

A similar effect to that shown in FIG. 6 may be obtained by, instead of altering the average cavity volume beneath each of the first 64 and second 65 sealing surfaces, altering the spacing between the cavities and thus affecting the cavity density.

The cavity density and/or cavity volumes may be different on at least selected opposing surface portions of the gasket proximate the first 64 and second 65 sealing surfaces, the opposing surface portions being selected regions of the first 64 and second 65 sealing surfaces that are substantially coextensive on opposite sealing surfaces of the gasket 61.

In such an asymmetric arrangement in the gasket 61 of FIG. 6, the surface adhesion properties can consequently be biased towards one surface. The contact area of one sealing surface 64 of the gasket 61 compared to the other sealing surface 65 will tend to prefer adherence to one surface over the other without the need for adhesives or surface preparations.

Figure 7:
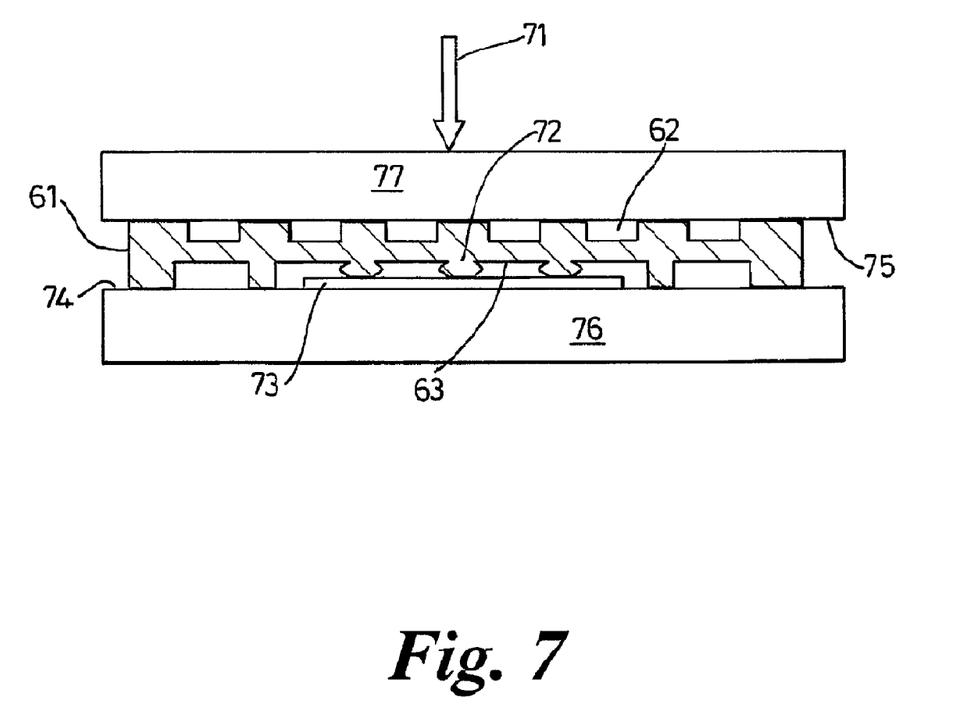
FIG. 7 shows a cross-sectional schematic view of a portion of a gasket according to an embodiment of the present invention while under an applied pressure.

Shown in FIG. 7 is a schematic view in cross-section of the behaviour of such a gasket 61 under compression between an upper component 77 and a lower component 76. The gasket 61 is situated between two component surfaces 74, 75. On the lower component surface 74 is situated a surface feature 73, which protrudes out of the plane of the component surface 74. Applying pressure in the direction indicated by arrow 71 causes the gasket material in the compensating region 72 to compress further than the material outside the compensating region. Additional compression of the gasket is taken up within the volume of the gasket itself, and does not cause any additional bulging around the external perimeter of the gasket 61. The cavities 63 permit the surrounding gasket material within the compensating region 72 to bulge into the cavities 63 along directions orthogonal to the direction of application of force. The surface feature 73 could, for example, be a foil or shim of relatively incompressible material, such as a water distribution foil, positioned to cover selected regions of the fluid flow plate. Since the gasket 61 is able to compressibly deform around the surface feature 73, the seal around the surface feature is not compromised by its presence.

The gasket 53, 61 of the present invention may preferably comprise rectangular cavities 56, 57, 62, 63 arranged in a regular array, for example in a substantially uniformly spaced square pattern, as is shown in FIG. 5. Other types of regular repeating patterns such as hexagonal or triangular patterns are also envisaged. Non-repeating patterns or random distributions of cavities, which also may be characterised by a cavity density and an average cavity volume, are also envisaged to be within the scope of the invention.

It is to be understood that the term "cavities" is intended to encompass definitions that apply to arrays of individually isolated cavities across a gasket, as well as arrays of interconnected cavities formed within arrays of individually isolated pillars or other raised features. A gasket of the present invention may comprise either one or both types of cavities across at least a portion of one or both sealing surfaces.

It is envisaged that a variety of conventional gasket materials may be used in the present invention, such as silicone, nitrile or butyl rubbers. However, other materials, such as expanded PTFE, may also be used.

The thickness of the gasket is preferably less than 10 mm. More preferably, the uncompressed gasket thickness lies between 0.1 and 3 mm, and more preferably still between 0.1 and 1 mm.

Preferably, the average volume of the cavities 56, 57, 62, 63 is less than 5 $mm^3$, and more preferably lies within the range of 0.001 to 1 $mm^3$. The cavities are preferably substantially cuboid in shape, although the cavities may be any suitable shape, and also preferably have an average linear dimension within the range of 0.1 to 1 mm.

The cavities of a gasket 53, 61 of the present invention are preferably formed by applying a texture to the surface(s) of a gasket of uniform thickness. This texturing may be performed by compression moulding of the gasket, for example between shaped platens under conditions of heat and pressure in order plastically deform the gasket material into the required shape. Alternatively, various techniques known in the art may be used to form the gasket material of the present invention, such as casting, injection moulding or rolling/calendering using textured rollers.

Figure 8:
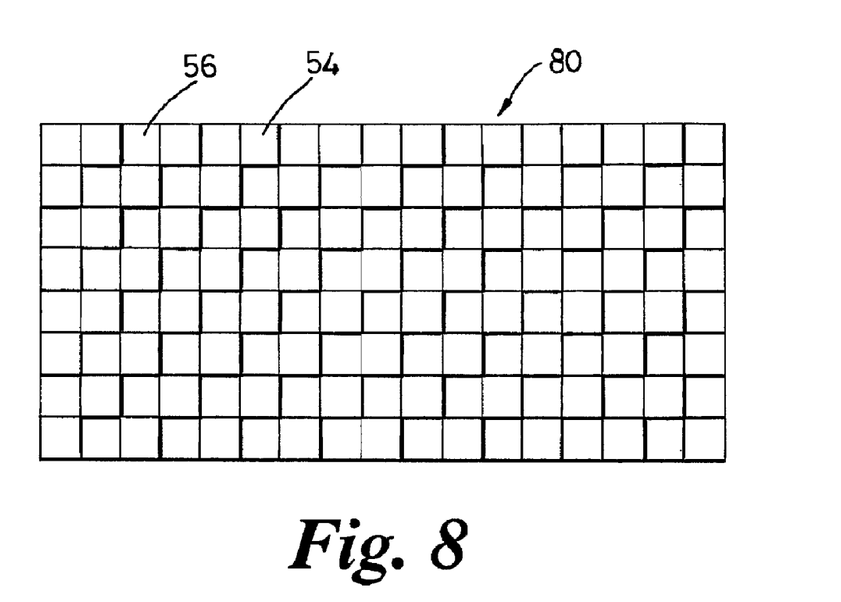
FIG. 8 shows a plan view of a closed cell grid structure of cavities of a gasket according to a preferred embodiment of the invention.
Figure 9:
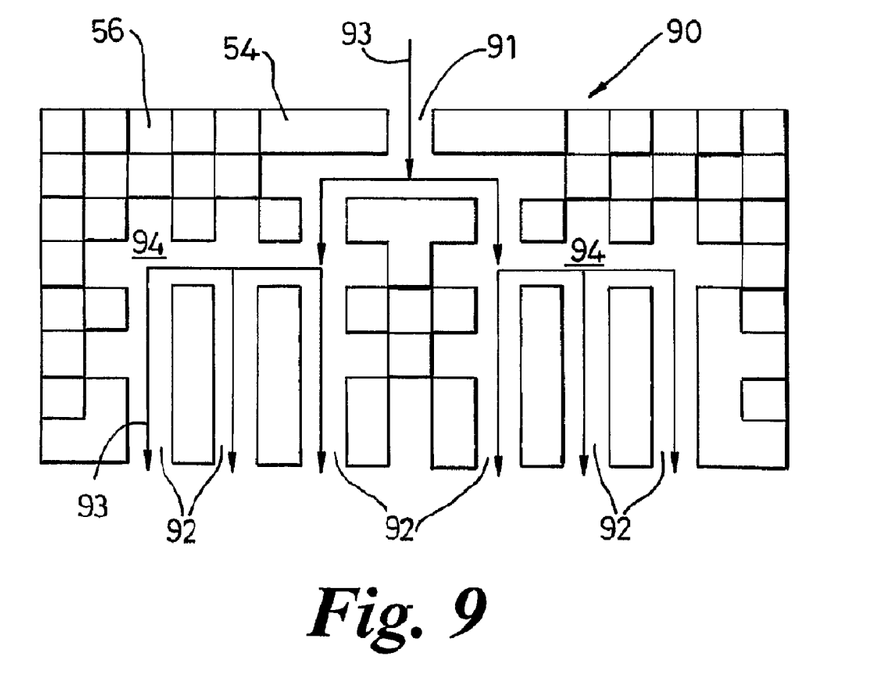
FIG. 9 shows a plan view of a closed cell grid structure of cavities of a gasket according to a preferred embodiment of the invention, with further fluid distribution channel cavities.

One possible further function the cavities of the present invention may perform is that of fluid distribution. Shown in FIG. 8 is a closed cell grid structure of cavities in a gasket according to the present invention, with a sealing surface 54 and isolated cavities 56. By altering this design such that selected cavities are extended and made interconnecting rather than being isolated from one another, an arrangement such as that shown in FIG. 9 can be arrived at. The gasket 90 has formed within it as part of the cavity pattern a series of interconnected fluid feed channels 91, 92, 94. Each of these fluid feed channels, as for the surrounding cavities 56, has a depth which extends at least partially through the thickness of the gasket 90. In the case where the gasket is formed directly on the fluid flow field plate, for example by moulding, the fluid feed channels may extend through the entire thickness of the gasket.

A fluid inlet channel 91 is connected to a plurality of fluid outlet channels 92 via fluid distribution channels 94. The preferred direction of fluid flow in use is indicated by arrows 93. In conjunction with the apertures 42, 43 provided in the gasket 41, as shown in FIG. 4, the arrangement illustrated in FIG. 9 can be engineered to distribute fluid from the fluid entry port 44 through to various parts of the plenum 49 adjacent the membrane-electrode assembly 40. The same type of arrangement can apply equally to a fluid exit port 45.

The compressibility of the gasket 90, which can be engineered via the density, depth and size of the cavities 56, can be used to control to a certain extent the degree to which the fluid feed channels 91, 92, 94 are able to pass fluid through. With an increased applied pressure across the gasket 90, the fluid feed channels 91, 92, 94 will become more restricted, tending to close up the fluid paths 93. The back pressure at the fluid entry port 44 will thereby increase. This may assist in improving the accuracy of fluid distribution across a number of membrane-electrode assemblies. The accuracy and rate of fluid metering may then be at least partially controlled by the pressure applied across the fuel cell assembly 30 comprising a gasket 91 of the type in FIG. 9. Separate components which would otherwise be necessary in performing these functions may then be advantageously removed.

Figure 10:
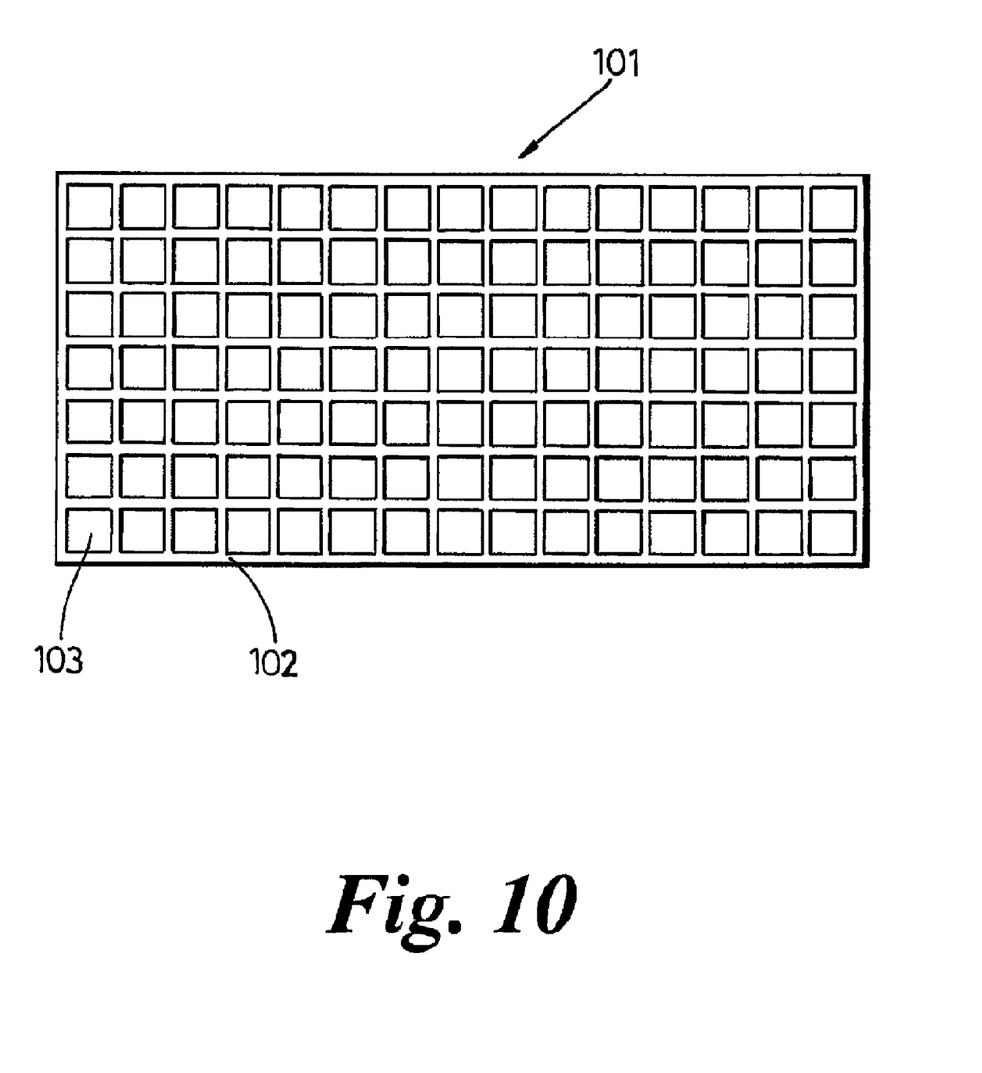
FIG. 10 shows a plan view of an alternative closed cell grid structure of cavities of a gasket according to a preferred embodiment of the invention.

An alternative gasket arrangement is illustrated in FIG. 10, in which a gasket 101 is provided with cavities 103 arranged in a regular grid pattern beneath the sealing surface 102. In this arrangement, the cavity volume and/or density can be increased beyond that possible in the arrangement shown in FIG. 8 while maintaining fluid isolation of each cavity when in use. Other types of cavity arrangements may also be envisaged, not restricted to square cavities or regular grid arrays of the kind illustrated by example. For example, circular cavities may be beneficial in terms of ease of manufacturing. Other shapes are also possible.

Figure 11:
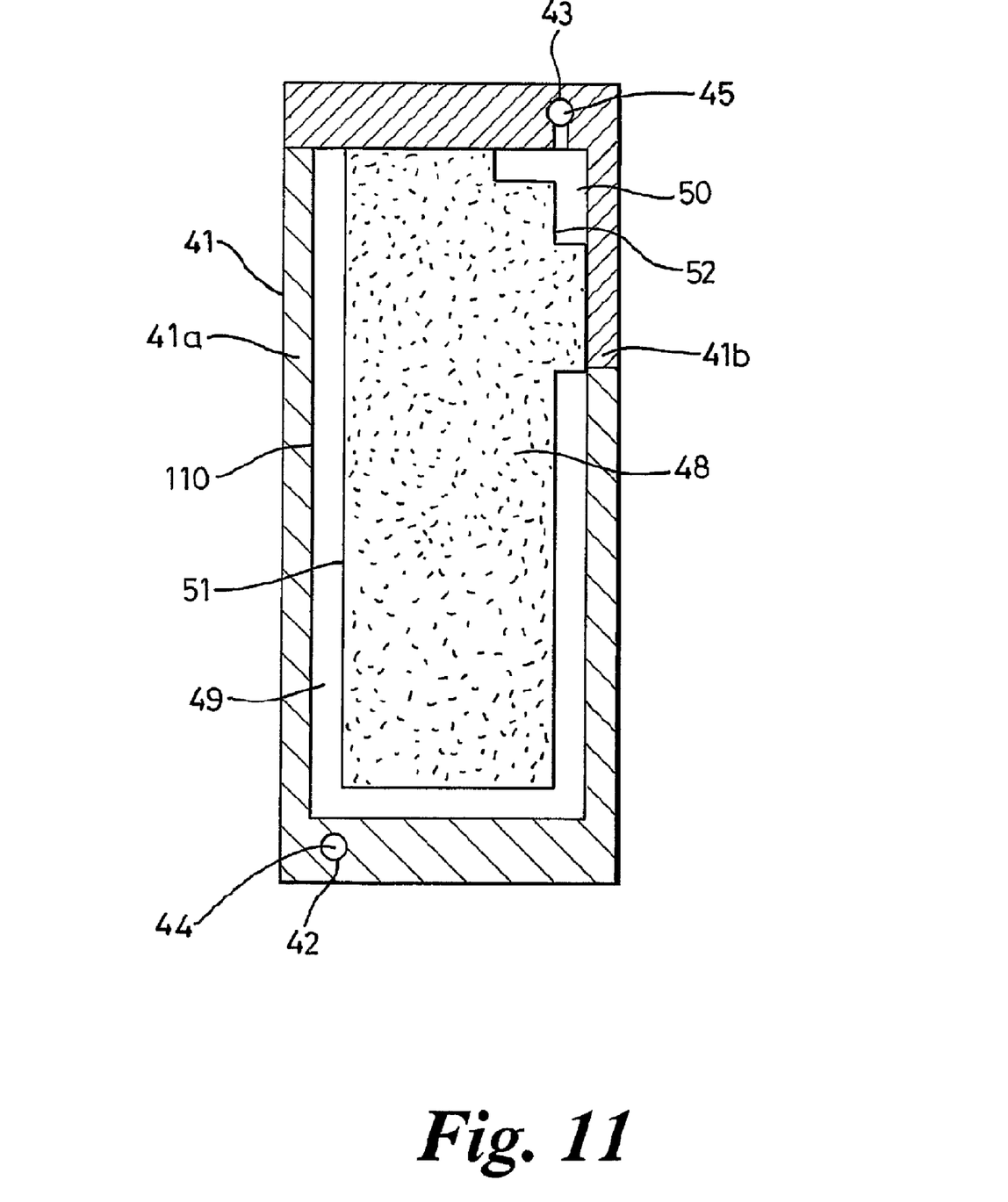
FIG. 11 shows a plan view of an anode configuration having two portions of differently engineered gasket material.

The cavities 56, 57, 62, 63 within a gasket 53, 61 may be provided within certain predetermined portions of the gasket 53, 61, according to their position on the gasket and the function they are required to perform. Shown in FIG. 11 is an example arrangement of an anode configuration with a gasket 41 surrounding a first plenum 49 and a second plenum 50 in a similar arrangement to that shown in FIG. 4. A first portion 41a of the sealing gasket is engineered, in accordance with the principles illustrated in FIG. 9 and detailed above, to have fluid distribution channels 94 within the first portion 41a and with fluid outlet channels 92 provided on the portion of the inner perimeter 110 of the gasket 41 in fluid communication with the first plenum 49. The fluid inlet channel 91 of the first portion 41a is coincident with the fluid entry port 44 at the aperture 42 in the gasket 41. Fluid entering the fluid inlet channel 91 is distributed along the inner perimeter 110 of the gasket proximate the first plenum 49, via fluid distribution channels 94 provided within the first portion 41a of the gasket 41. The second portion 41b of the gasket 41 is engineered in this example in a way illustrated in FIGS. 5 and 8, and detailed above, such that fluid exits from the second plenum 50 via the fluid exit port 45 situated at an aperture 43 in the gasket 41.

Figure 12:
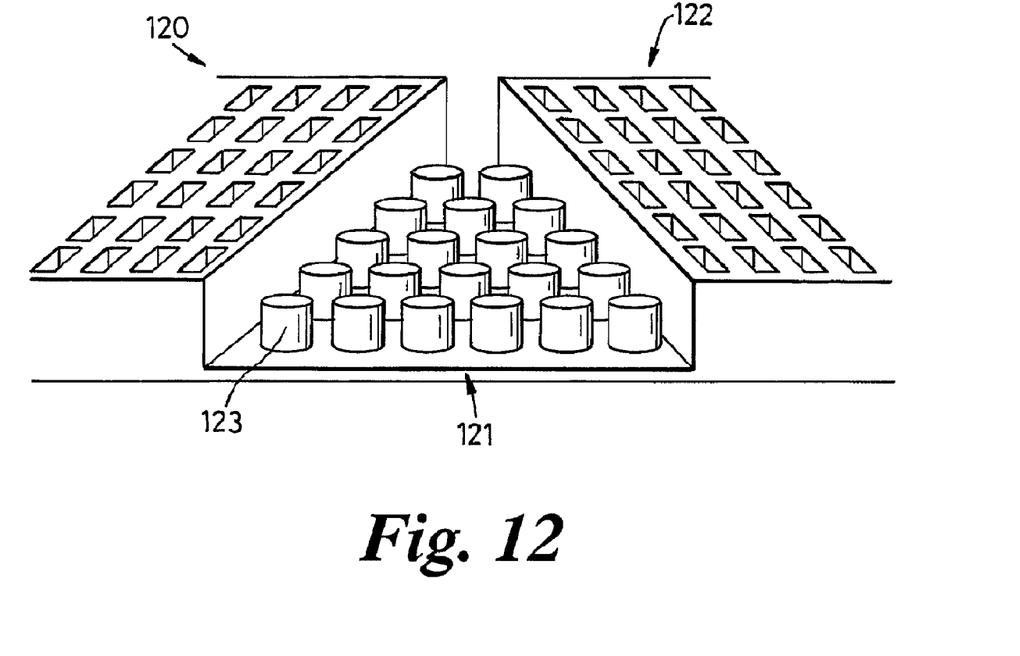
FIG. 12 shows a perspective view of an alternative configuration of gasket comprising open cell and closed cell regions.

Fluid distribution through the gasket may be achieved through engineering open cell regions of the gasket. Shown in FIG. 12 is an example of such a gasket 120, comprising closed cell regions 122 and open cell regions 121. Fluid may flow within the open cell regions around the pillars 123, which are in this example formed as circular or oval cylinders. The pillars 123 may alternatively be cylinders of rectangular or polygonal section, or even be of varying section such as conical or pyramidal shapes. The arrangement of the pillars may be of any suitable repeating or non-repeating pattern, or may be randomly distributed. Examples of possible patterns include regular square or hexagonal packing or herringbone patterns.

The pillars 123 may advantageously be formed to be of a height selected to be different from that of the surrounding closed cell region. Choosing the pillars to be of reduced height enables distortion to be reduced when the gasket 120 is under compressive pressure. The reduced height of such pillars may also serve to support components which might overlay the open cell region. Choosing the pillars 123 to be higher than the surrounding gasket will result in the pillars being more compressed than the surrounding material, which may be used in metering fluid flow through the open cell region 121.

Figure 13:
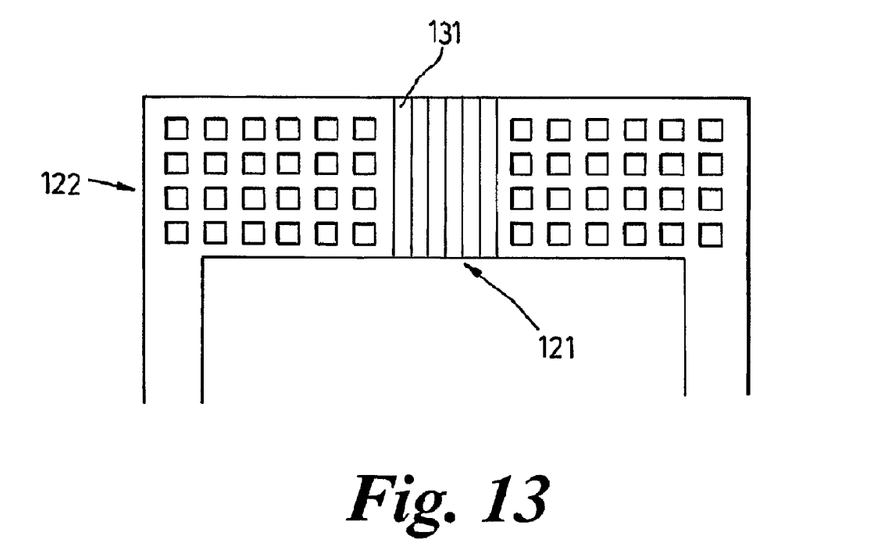
FIG. 13 shows a plan view of a further alternative configuration of gasket comprising open cell and closed cell regions.

As shown in FIG. 13, the open cell region 121 may comprise a fluid entry and/or exit port itself, in this example consisting of a series of fluid channels 131 extending across the gasket and bounded by closed cell regions 122.

Figure 14:
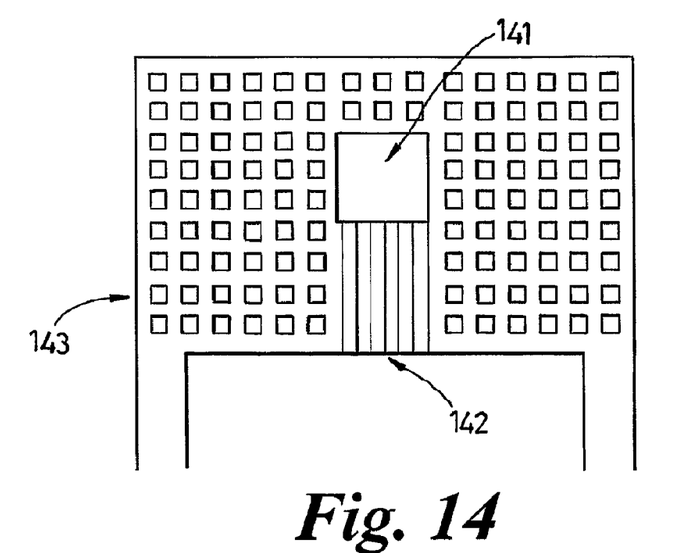
FIG. 14 shows a plan view of a further alternative configuration of gasket comprising a fluid port together with open and closed cell regions.

As shown in FIG. 14, the gasket may comprise a fluid port 141, which can be for fluid entry or exit. The fluid port 141 is surrounded by a closed cell region 143, except for where passage of fluid across the gasket is required, where there is a fluid delivery region 142 comprising an open cell region as in FIG. 12. This open cell region 142 may comprise a series of fluid channels or may alternatively comprise a plurality of interconnected cavities formed between raised pillars of the gasket material.

It is to be understood that the gasket of the present invention need not be of unitary construction, i.e. formed entirely of one type of compressible material, but may instead be formed from more than one type of material. For example, the gasket may consist of a first layer of compressible material in which the cavities are provided and a second underlying layer of a relatively incompressible material. The first layer may be applied by any suitable means, for example by screen printing, lamination, moulding or other processes. A pattern in the layer of compressible material can thereby define an arrangement of cavities across at least a portion of one or both of the sealing surfaces of the gasket. For example, a silicone rubber pattern can be applied by screen printing to one or both surfaces of a polyester foil, thereby forming after curing an elastically compressible surface layer. The surface layer thus formed imparts improved sealing properties to the foil, which would otherwise be generally unsuitable for sealing applications. Patterns such as those illustrated in FIGS. 8-10 may preferably be applied, although any suitable pattern comprising cavities is envisaged.

Figure 15:
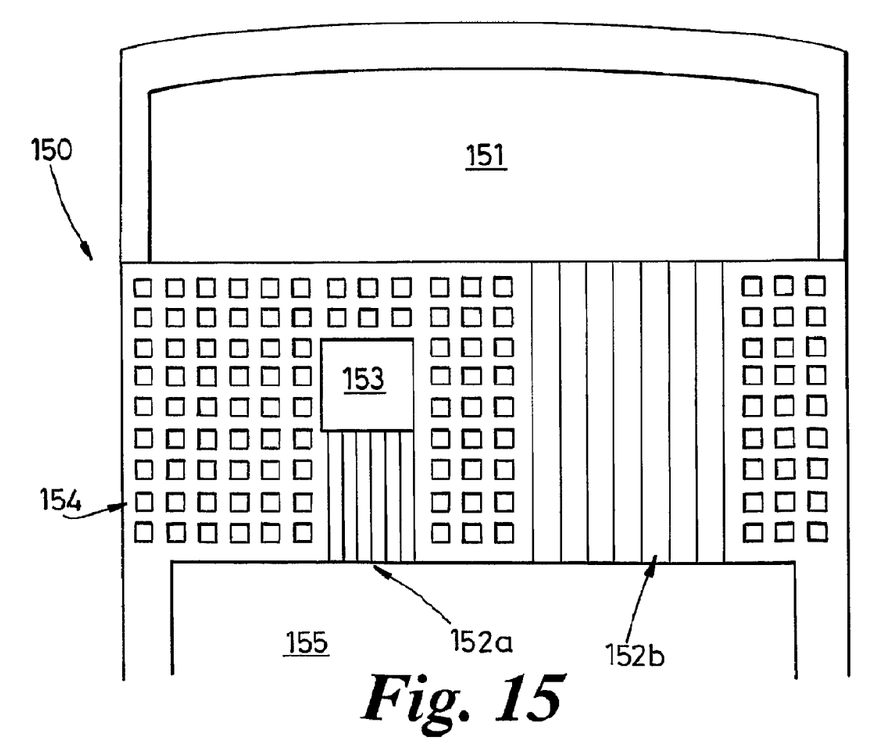
FIG. 15 shows a plan view of an alternative configuration of a gasket comprising a fluid port, fluid delivery channels and in fluid connection with an external fluid manifold.

Shown in FIG. 15 is a further alternative arrangement of a gasket 150, in which a combination of closed cell and open cell regions is provided to form defined fluid delivery regions within the gasket 150. A fluid port 153 is surrounded by a closed cell region 154, except for a region comprising fluid delivery channels 152a. The fluid delivery channels 152 fluidly connect the fluid port 153 to an interior volume 155 defined by the gasket 150. A further region of fluid delivery channels 152b serves to connect the interior volume 155 defined by the gasket 150 to an external manifold 151. The external manifold 151 may, for example, be used to deliver coolant to the fuel cell, while the fluid port 153 delivers oxidant.

The gaskets as described here meet the particularly exacting requirements for gaskets used in fuel cells. Such fuel cell gaskets are typically required to have a high dimensional accuracy over a large area and may need to achieve sealing over a large surface area with a compression of, for example, just 0.2 mm for each cell. To reduce distortion of a fuel cell stack having many individual cells, and to allow adequate volume for a diffuser layer within each cell, the thickness dimensions of a sealing gasket may need to vary by only around 10% when a sealing pressure is applied. Highly toleranced surfaces are therefore required on mating surfaces of the gaskets to avoid leaks. Fuel cell gaskets also, however, require sufficient resilience and flexibility to allow for thermal expansion and contraction of other components such as tie rods passing through the cells of a stack. A high degree of precision on loading and sealing fuel cell stacks is required and the gaskets described here surprisingly offer significant advantages in this respect. The cavities of the gaskets described enable a reduction in load and improved ability to seal around surface protrusions and allow certain dimensional and loading tolerances to be relaxed while not compromising the sealing ability of the gasket or the dimensional accuracy throughout the thickness of a fuel cell stack.

Other embodiments are envisaged to be within the scope of the appended claims.

The invention claimed is:

1. A gasket formed of compressible material and having a first sealing surface and a second sealing surface for providing a fluid seal between a first component and a second component, the gasket comprising:

cavities proximate the first and/or second sealing surfaces and extending over at least a first portion of the gasket that affect compressibility of the gasket in the first portion;

wherein the first portion of the gasket comprises a closed cell region comprising cavities, and wherein a second portion of the gasket comprises an open cell region comprising cavities, the cavities in the open cell region forming fluid feed channels within the gasket proximate the first sealing surface, each fluid feed channel having a depth extending at least partially through the gasket.

2. The gasket of claim 1, in which cavity density and/or cavity volumes in at least the first portion vary across at least one of the first and second sealing surfaces.

3. The gasket of claim 1, in which cavity density and/or cavity volumes in at least the first portion are different on the first and second sealing surfaces.

4. The gasket of claim 3, in which cavity density and/or cavity volumes in at least the first portion are different on selected opposing surface portions of the gasket.

5. The gasket of claim 1, in which the cavities in at least the first portion are arranged in one or more regular arrays.

6. The gasket of claim 1, wherein the cavities in at least the first portion have an average linear dimension within the range of 0.1 mm to 1 mm.

7. The gasket of claim 1, wherein the cavities in at least the first portion have an average volume within the range of 0.001 $mm^3$ to 1 $mm^3$.

8. The gasket of claim 1, wherein the cavities in at least the first portion are cuboid in shape.

9. The gasket of claim 1, in which the fluid feed channels are fluidly connected to an aperture comprising a fluid entry and/or exit port.

10. The gasket of claim 9, in which the fluid feed channels are adapted to be fluidly connected to a membrane-electrode assembly of a fuel cell.

11. The gasket of claim 1, in which the gasket comprises a first layer of compressible material in which the cavities are provided.

12. A method of sealing a fuel cell, comprising:
positioning a gasket between a fluid flow field plate and a membrane-electrode assembly, the gasket being formed of compressible material having a first sealing surface and a second sealing surface and a plurality of cavities proximate the first and/or second sealing surfaces and extending over at least a first portion of the gasket that affect compressibility of the gasket in the first portion, wherein the first portion of the gasket comprises a closed cell region comprising cavities, and wherein a second portion of the gasket comprises an open cell region comprising cavities, the cavities in the open cell region forming fluid feed channels within the gasket proximate the first sealing surface, each fluid feed channel having a depth extending at least partially through the gasket; and
applying compressive pressure between the fluid flow field plate and membrane-electrode assembly across the gasket to provide a fluid-seal therebetween.

13. A fuel cell comprising:
a membrane electrode assembly;
a fluid flow field plate; and
a gasket according to claim 1.

* * * * *